July 15, 1924.

B. T. HEADLEY ET AL 1,501,773

VIAL NECKING MACHINE

Filed May 7, 1918

WITNESSES

INVENTOR

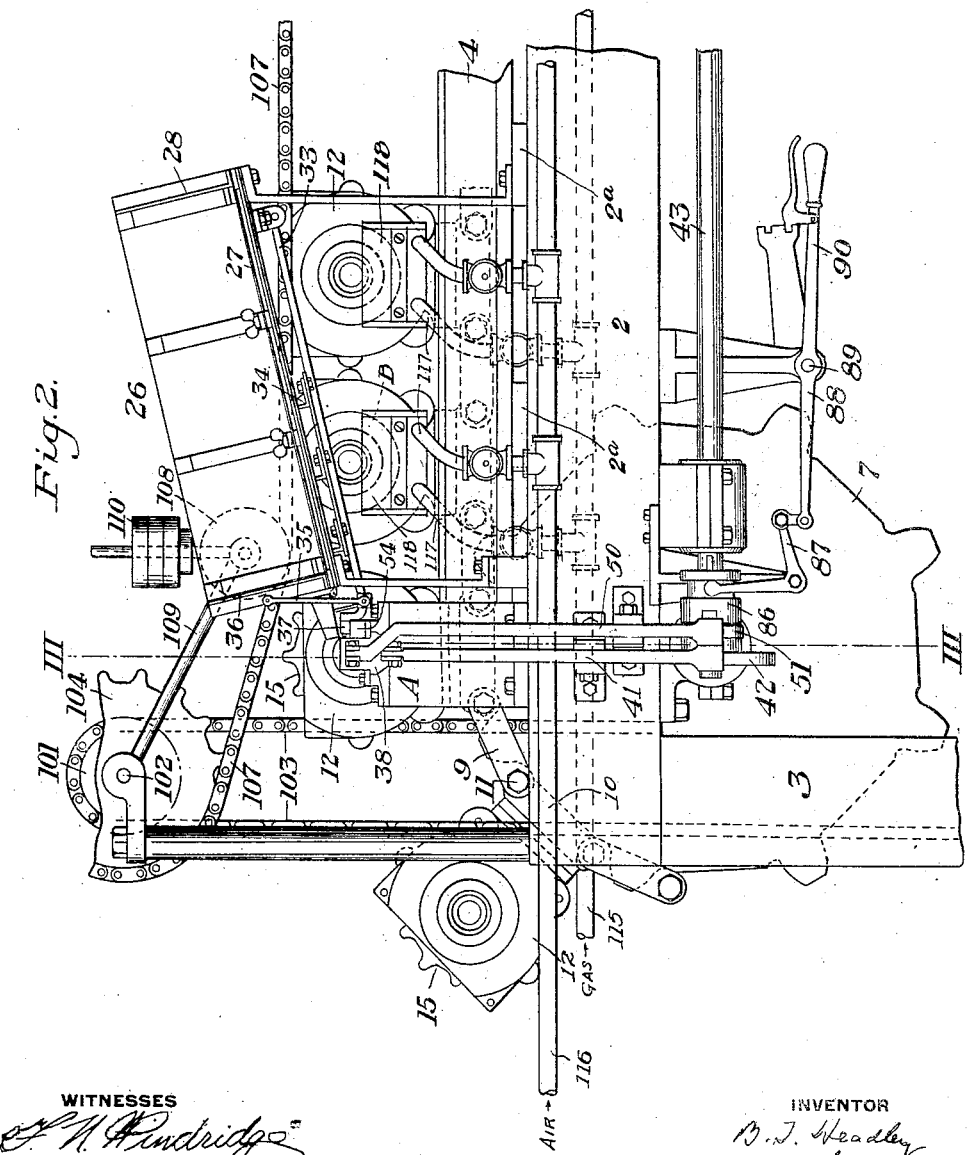

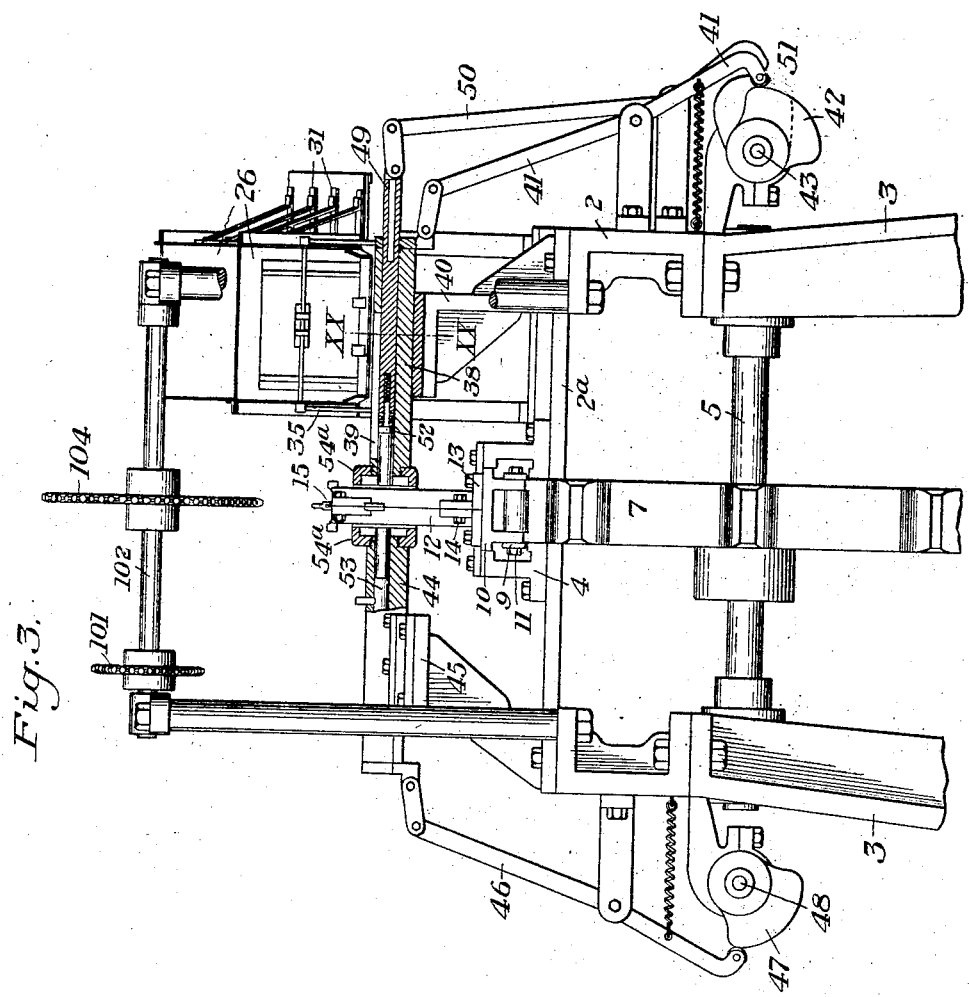

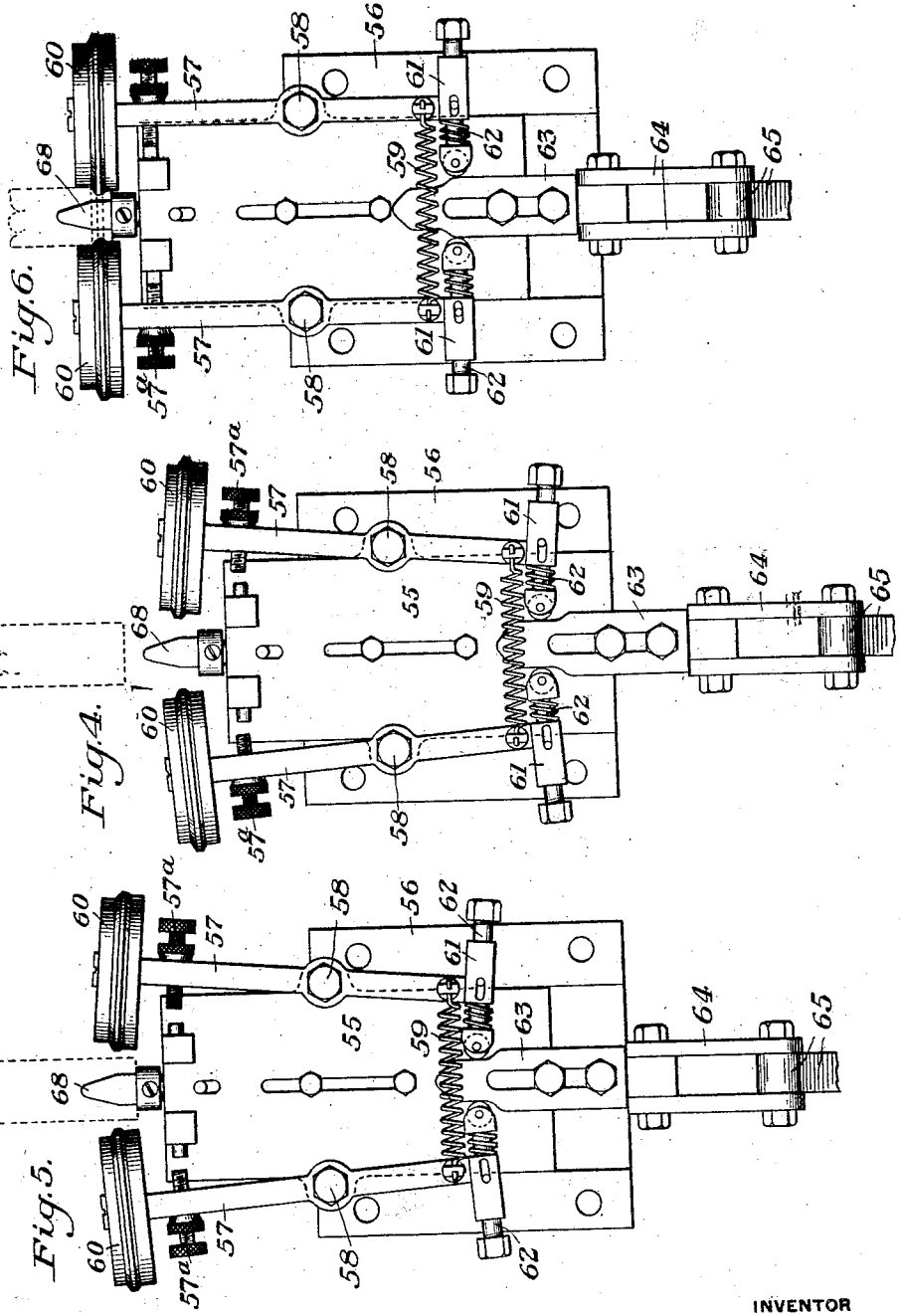

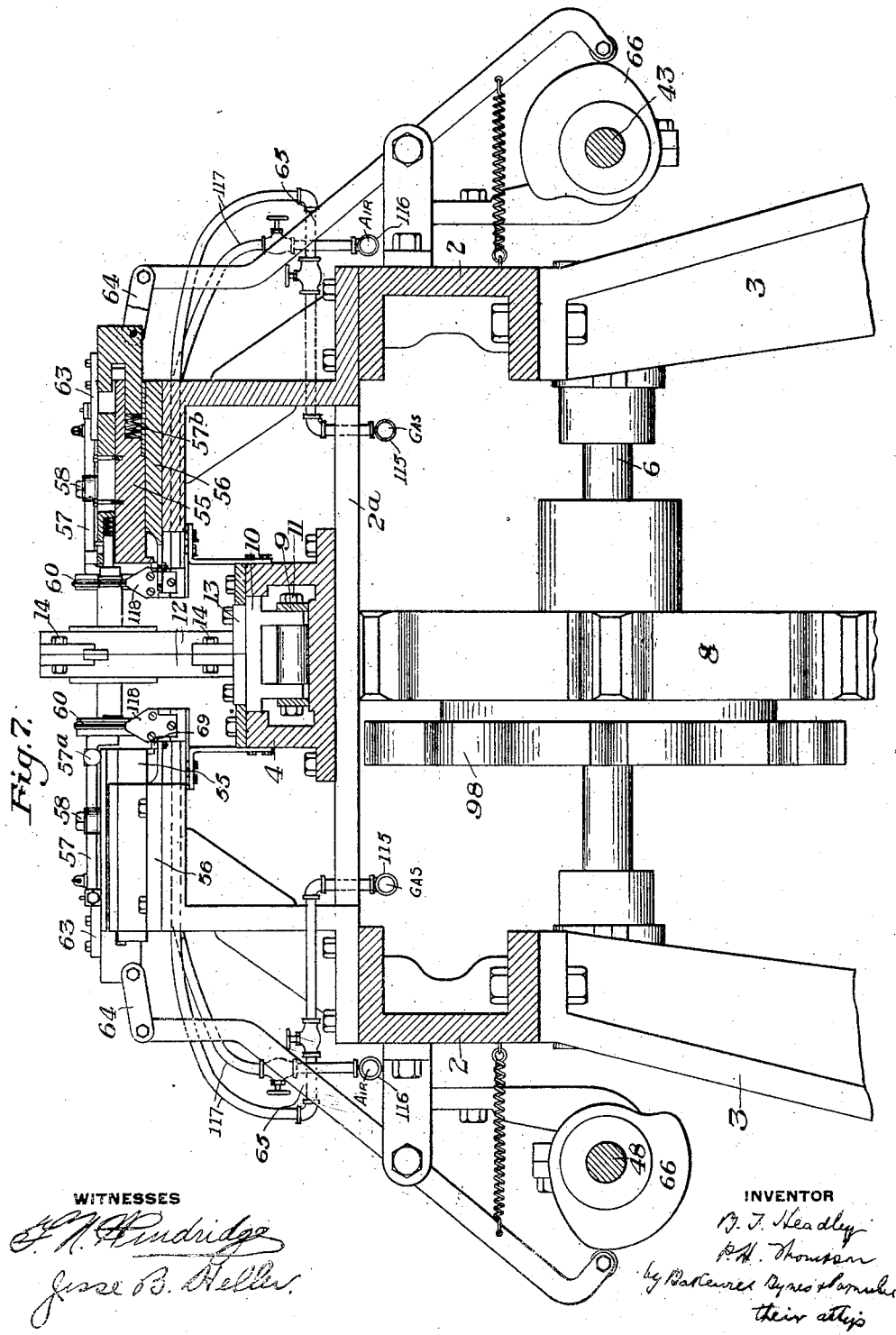

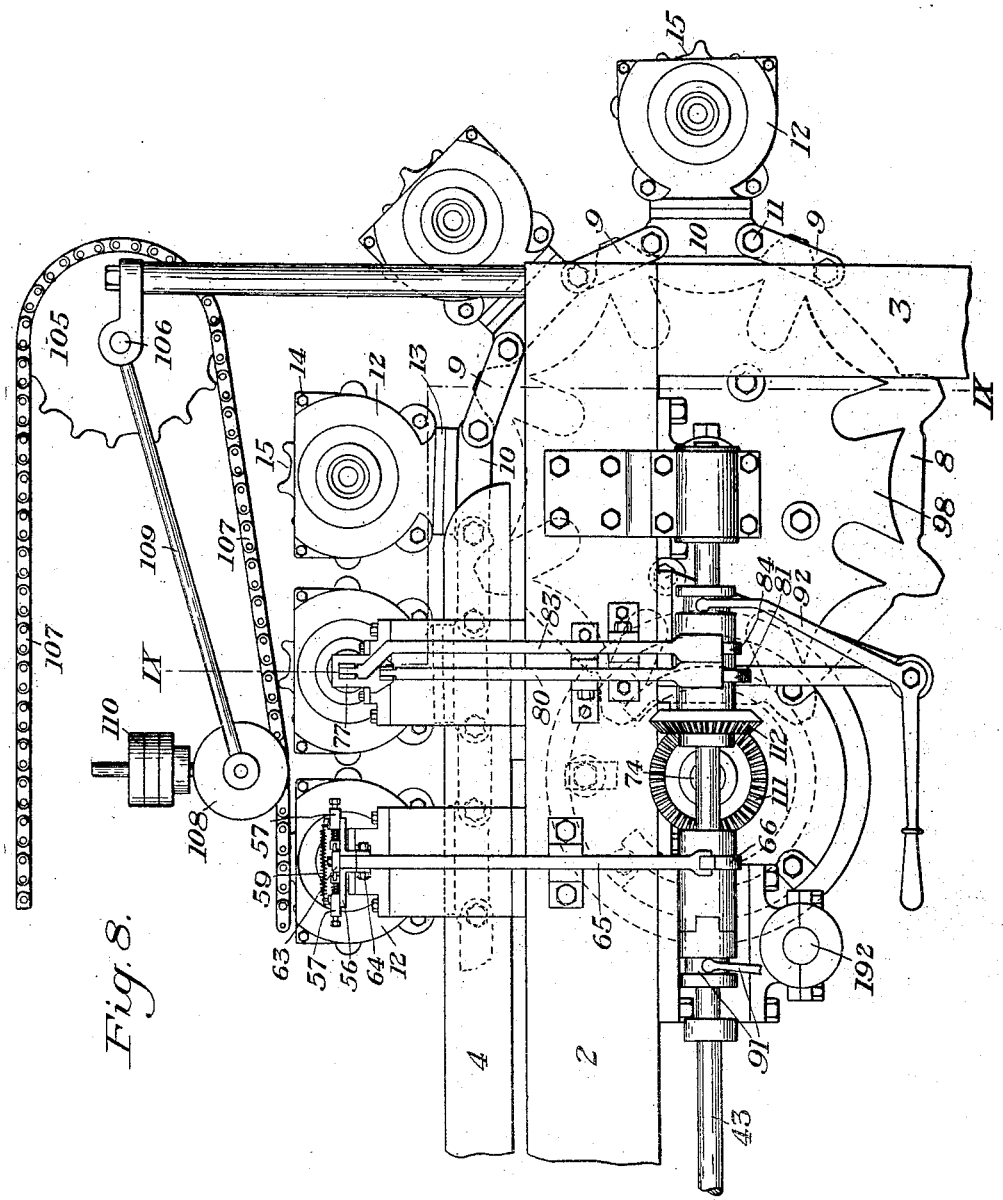

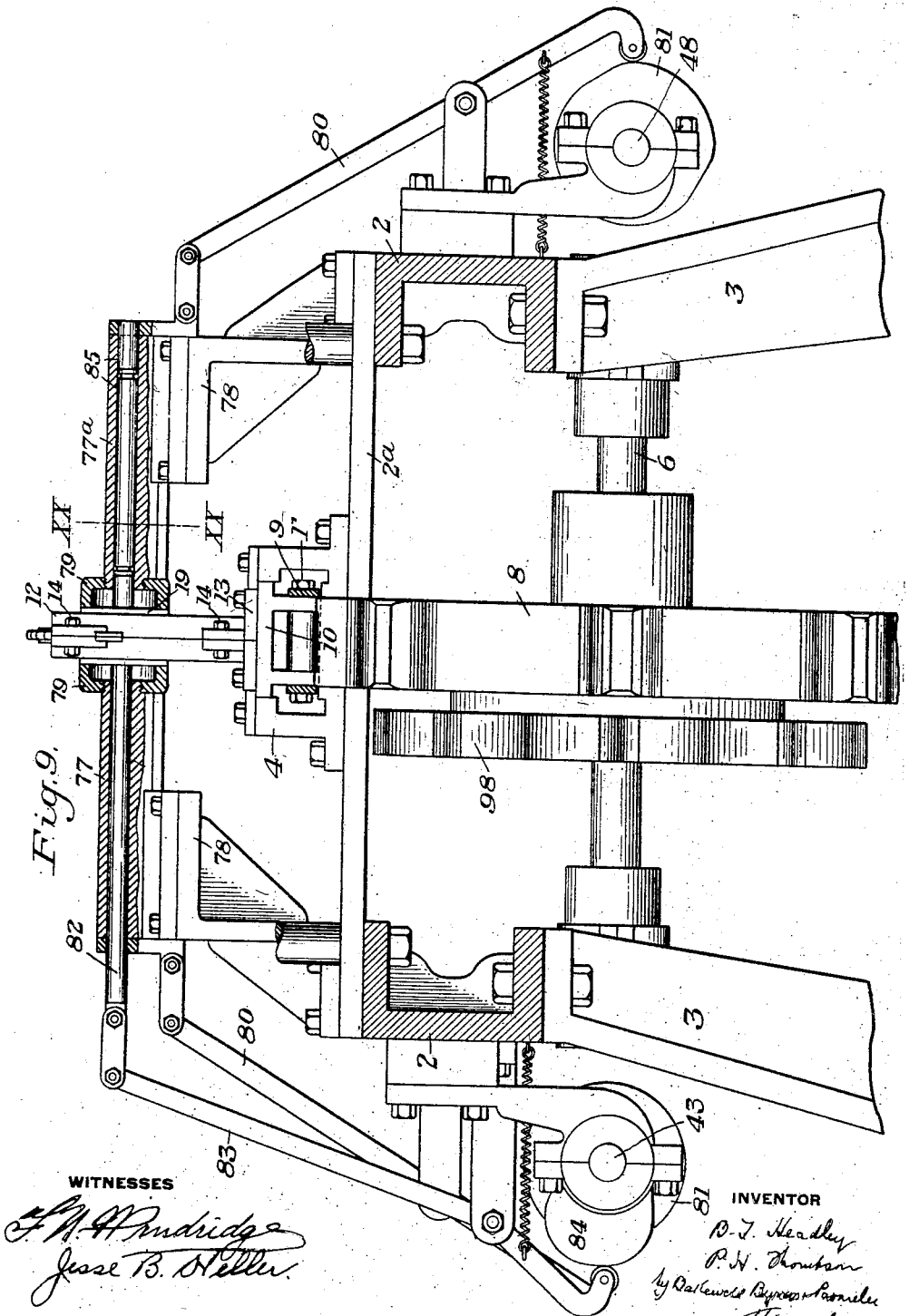

July 15, 1924.
B. T. HEADLEY ET AL
1,501,773
VIAL NECKING MACHINE
Filed May 7, 1918    13 Sheets-Sheet 8
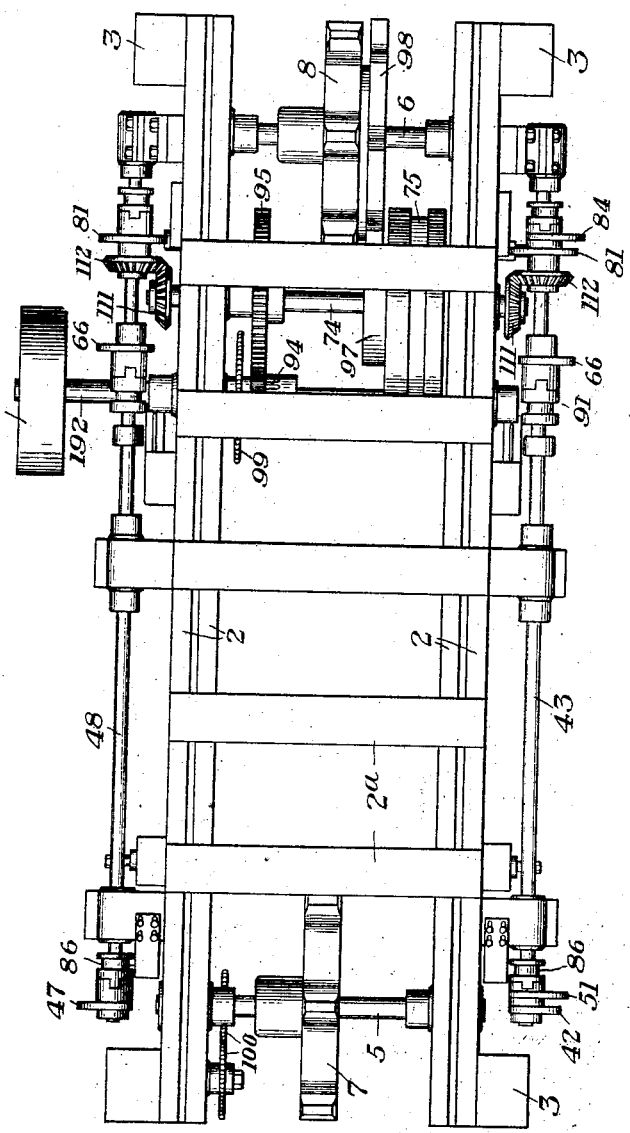

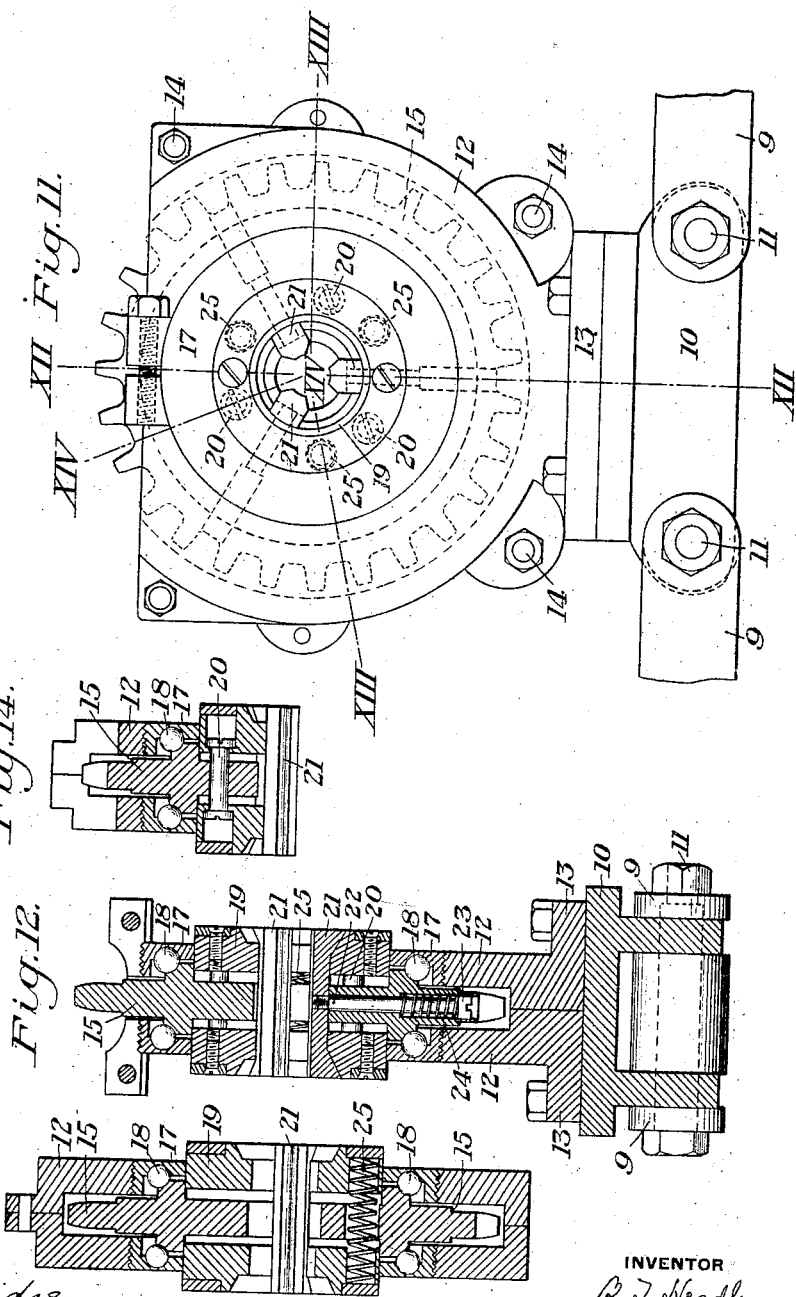

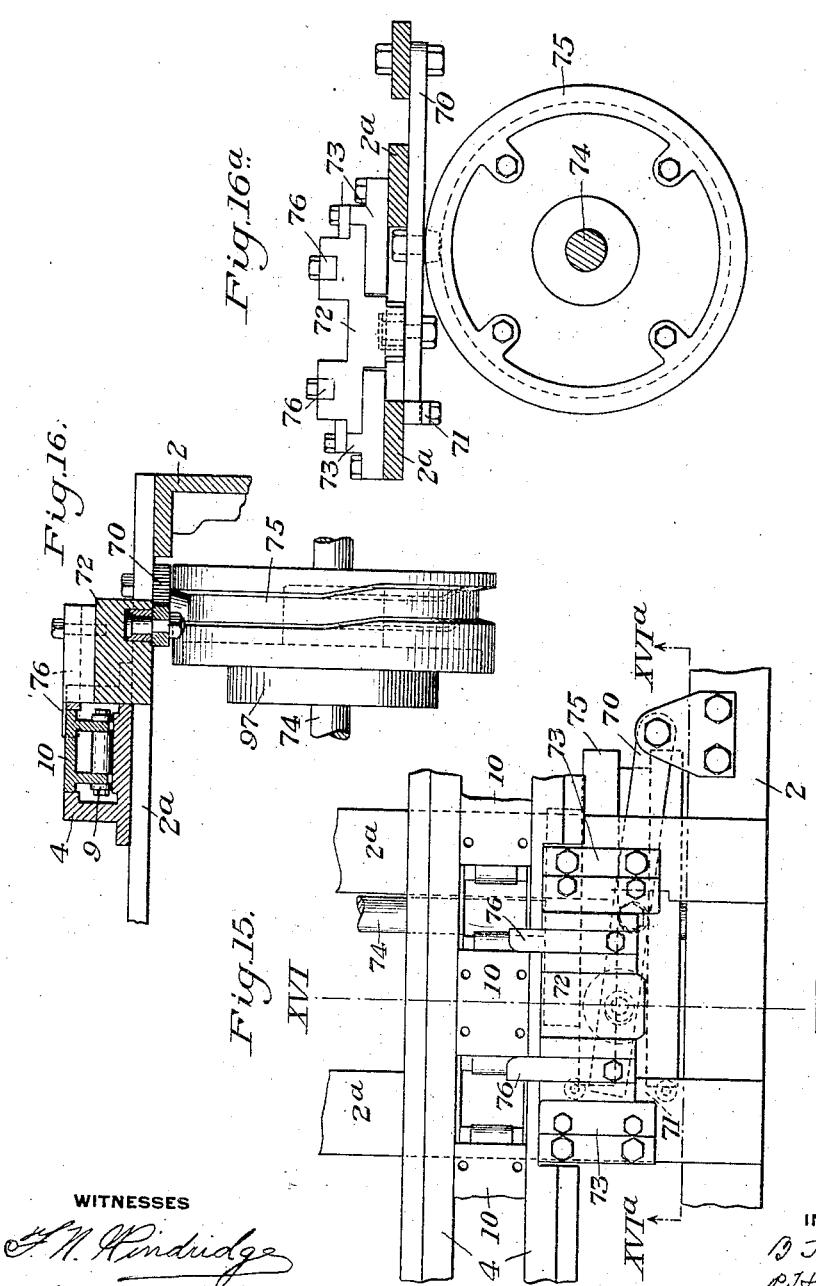

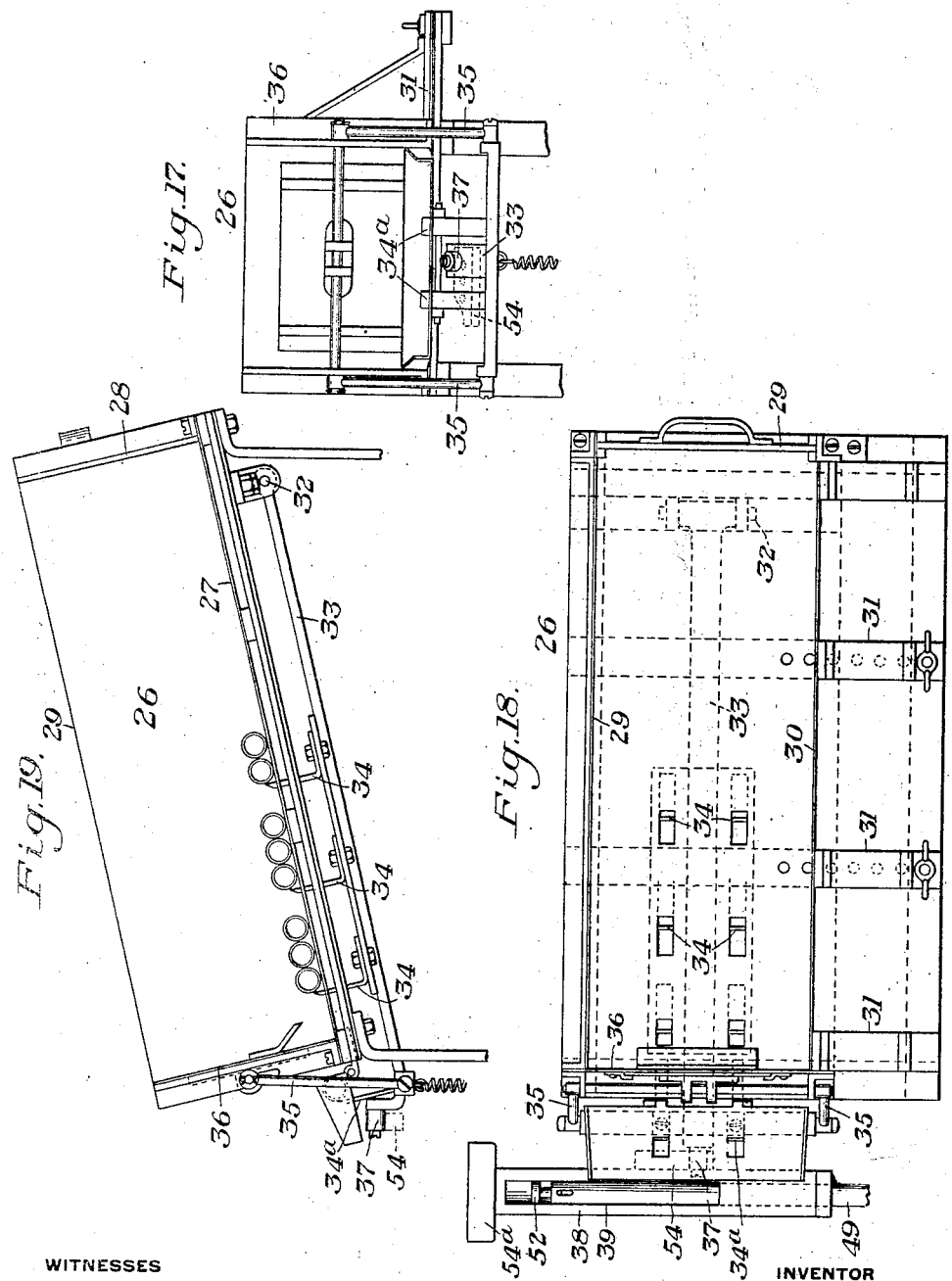

July 15, 1924.
B. T. HEADLEY ET AL
1,501,773
VIAL NECKING MACHINE
Filed May 7, 1918
13 Sheets-Sheet 12
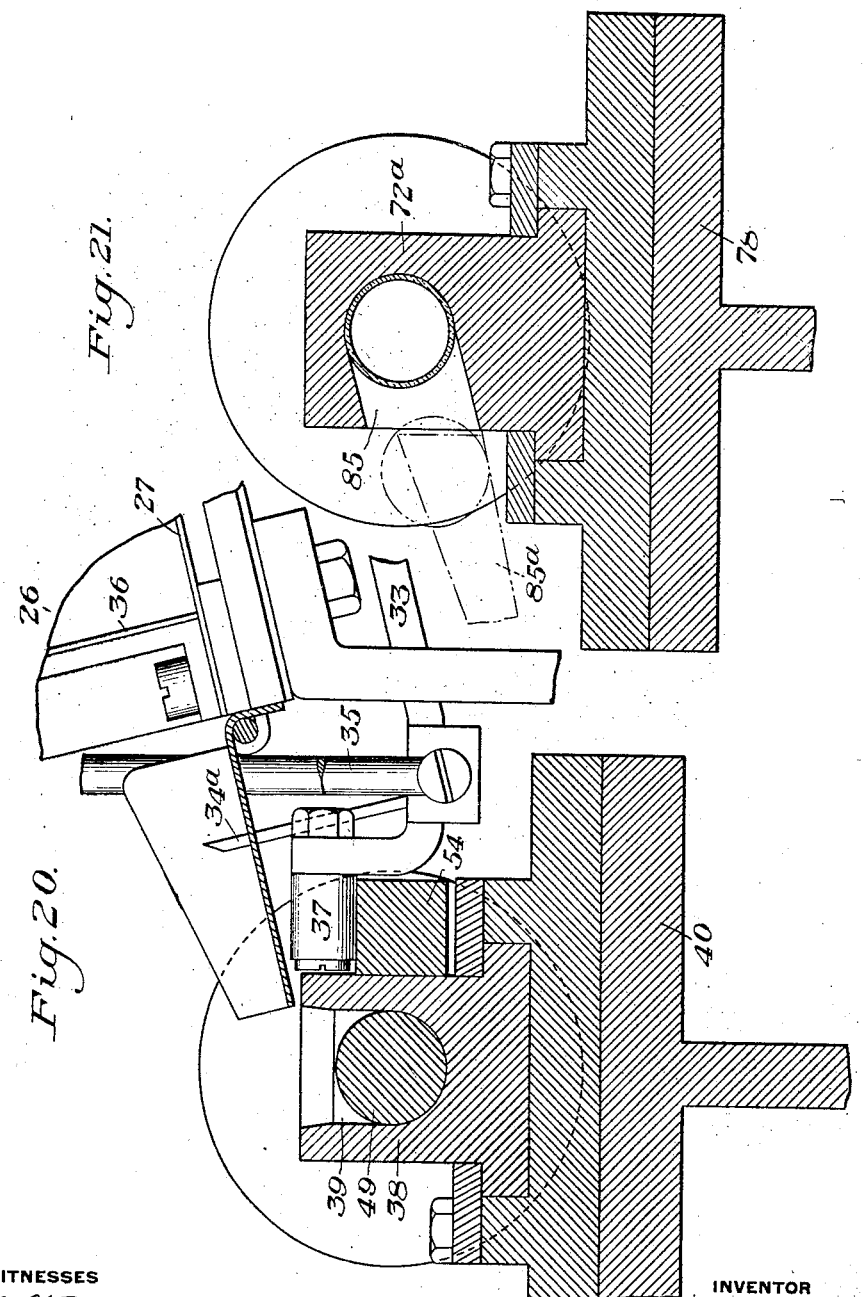

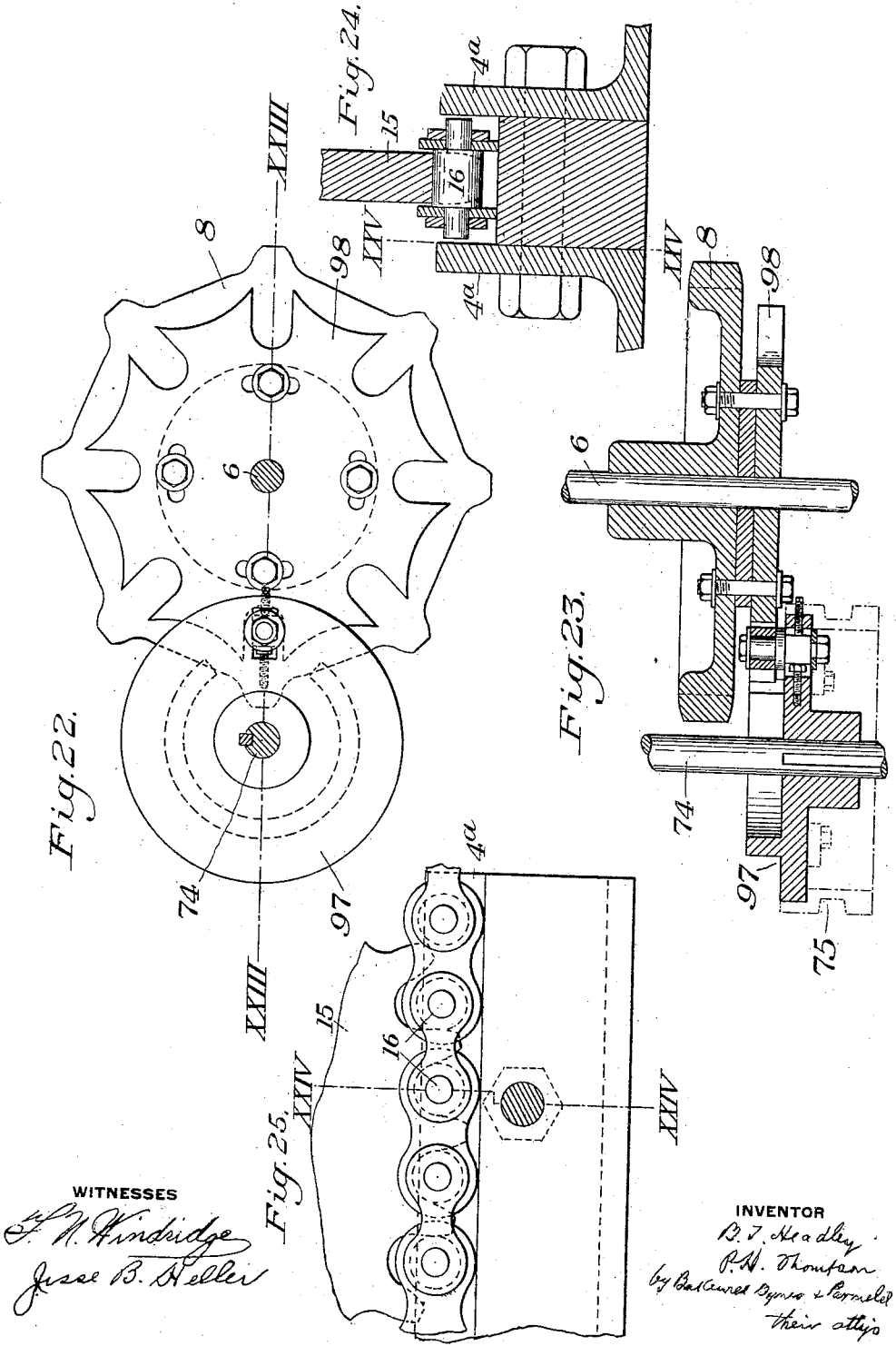

Patented July 15, 1924.

1,501,773

UNITED STATES PATENT OFFICE.

BENJAMIN T. HEADLEY AND PARKE H. THOMPSON, OF MILLVILLE, NEW JERSEY, ASSIGNORS TO MILLVILLE MACHINE COMPANY, OF MILLVILLE, NEW JERSEY, A CORPORATION OF NEW JERSEY.

VIAL-NECKING MACHINE.

Application filed May 7, 1918. Serial No. 233,078.

*To all whom it may concern:*

Be it known that we, BENJAMIN T. HEADLEY and PARKE H. THOMPSON, both citizens of the United States, residing at Millville, Cumberland County, New Jersey, have invented certain new and useful Improvements in Vial-Necking Machines, of which the following is a full, clear, and exact description, reference being had to the accompanying drawings, forming part of this specification, in which—

Figure 2 is a similar view on a larger scale of the loading end of the machine.

Figure 3 is an end view partially in section on the line III—III of Figure 2.

Figures 4, 5 and 6 are detail plan views of the finishing mechanism with the parts in three different positions.

Figure 7 is a partial sectional view on the line VII—VII of Figure 1.

Figure 8 is a side elevation of a portion of the machine on a larger scale showing the unloading mechanism.

Figure 9 is a sectional view on the line IX—IX of Figure 8.

Figure 10 is a plan view of the frame and some of the driving shafts.

Figure 11 is a detail side elevation of one of the chuck casings and a portion of the endless conveyor.

Figures 12, 13 and 14 are sectional views on the lines XII—XII, XIII—XIII, and XIV—XIV of Figure 11.

Figure 15 is a detail plan view of the locking mechanism for locking the chucks at the finishing station.

Figure 1:
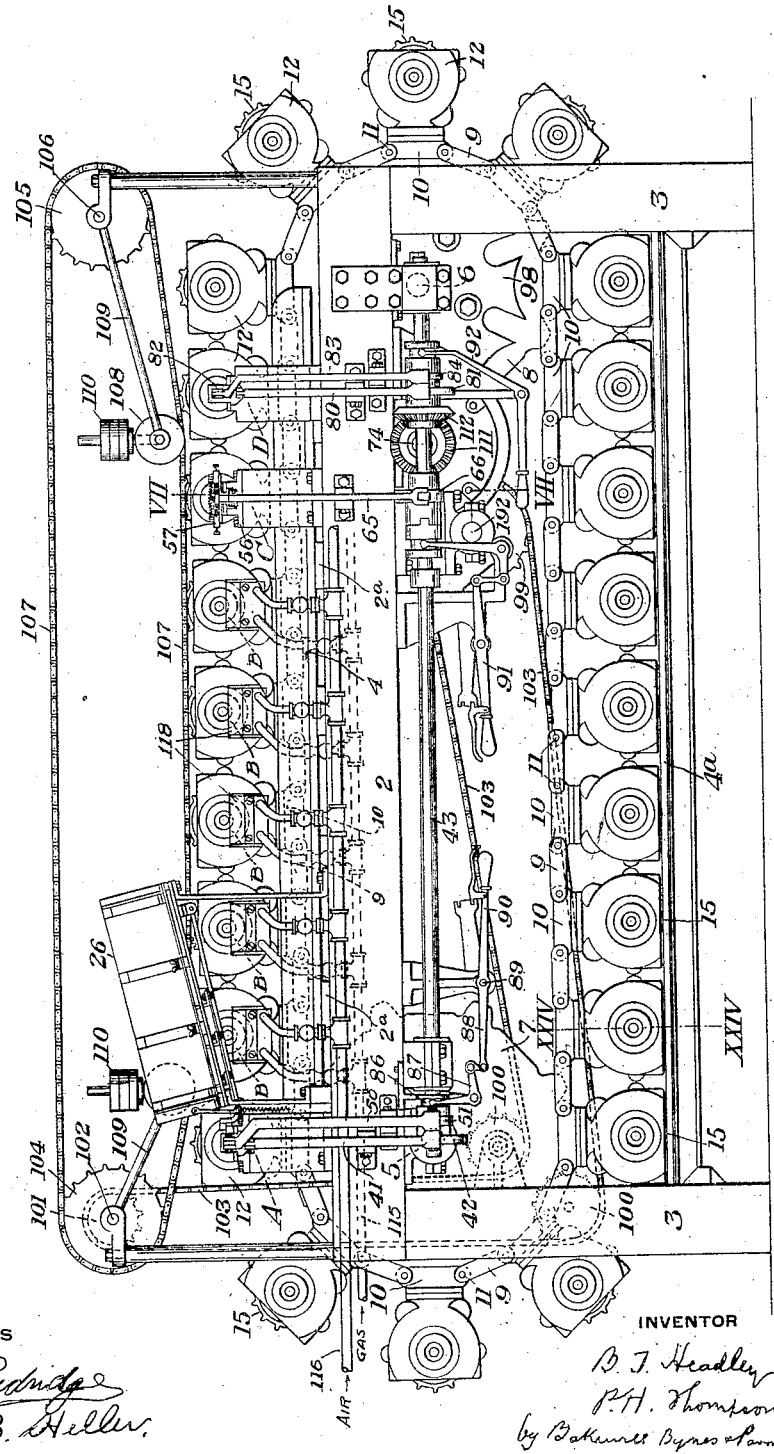
Figure 1 is a side elevation of one form of a machine built in accordance with our invention.

Figures 16 and 16$^a$ are detail sectional views on the lines XVI—XVI and XVI$^a$—XVI$^a$ respectively, of Figure 15.

Figure 17 is an end view of the hopper for the blanks.

Figure 18 is a plan view of the hopper.

Figure 19 is a side elevation of the hopper with the side removed.

Figure 20 is a detail sectional view on the line XX—XX of Figure 3, showing a portion of the loading mechanism.

Figure 21 is a similar view on the line XXI—XXI of Figure 9, showing the unloading mechanism.

Figure 22 is a detail view illustrating the driving mechanism for the endless carrier.

Figure 23 is a sectional view on the line XXIII—XXIII of Figure 22.

Figure 24 is a detail sectional view on the lines XXIV—XXIV of Figures 1 and 25, and Figure 25 is a detail sectional view on the line XXV—XXV of Figure 24.

This invention relates to an improvement in vial necking machines, and is designed to provide an inexpensive and efficient machine of this character, in which each of the blanks is positively centered in a chuck and positively rotated while passing the heating and finishing stations. Another object of our invention is to provide a machine which can be operated at a comparatively high speed and at the same time provide sufficient time for heating the blanks to be operated on. Still another object of our invention is to provide clutch mechanisms for each of the parts, so that if, for any reason, one of the blanks should be damaged, each set of mechanisms can be disconnected when the said blank reaches that station and thereby avoid stopping the machine if one of the blanks should be defective or become broken.

A still further object of our invention is to provide a self-contained machine in which the blanks are automatically fed to the chucks at a loading station A at one end of the machine, and are then passed over successive heating stations B, then to a finishing station C, and afterwards to an unloading station D where the finished blanks are discharged from the chuck and are adapted to be fed to a bottoming machine or any suitable source.

The machine comprises a supporting frame and operating shafts journaled therein, for actuating an endless conveyor having a plurality of equally spaced chuck carriers thereon, each of which has a chuck rotatably mounted therein. The chucks are each arranged to be rotated by means of a sprocket chain which is continuously rotated, and which is arranged to rotate the chucks during a portion of their travel.

The chucks are successively brought to a stop at the loading station, where a bottle forming blank is fed into the chuck. The chucks are arranged to be opened by the loading mechanism, and just prior to the movement of the chucks from the loading station the chucks are automatically closed to centralize the blank. The chucks are successively moved past the heating stations at which the ends are heated, and are successively brought to the finishing station where finishing members are moved into engagement with the ends of the blank which protrude beyond the chucks to form the mouths of the vials. The various chucks are locked in a positive position while at the finishing station in order to centralize the chuck with relation to the finishing devices. The chucks are successively moved from the finishing station to the unloading station at which the finished blanks having a mouth at each end are ejected from the chucks and are passed to a vial bottoming machine or to any suitable receptacle.

The chucks, while at the various heating stations and the finishing station, are continuously rotated by means of an endless chain which simultaneously rotates all of the chucks in connection therewith.

All of the various parts are operated by means of the various shafts which are rotated from a single source of power or a main driving shaft, the chuck rotating chain being continuously driven, while the endless chuck carrier is moved step by step by means of a Geneva movement.

The precise nature of our invention will be best understood by reference to the accompanying drawings which will now be described, it being premised, however, that various changes may be made in the details of construction and arrangement of the various parts, without departing from the spirit and scope of our invention, as defined in the appended claims.

Referring to the accompanying drawings, the reference character 2 designates the side frame members of the main frame, which are supported on standards 3. The side frame members are connected to each other by means of a plurality of cross-bars 2ª, and supported on these cross-bars 2ª is a chuck carrier support or track 4 which is cut away at its ends for the reception of sprocket wheels for the chuck carrier. The lower ends of the standards 3 are connected to each other by means of channels 4ª, which form a track for supporting the chuck carrier, as hereinafter described.

Endless chuck carrier.

Journaled in bearings connected to the frame are shafts 5 and 6, the shaft 5 being at the front end of the machine, while the shaft 6 is at the rear end thereof. Connected to the shaft 5 is a sprocket wheel 7 and connected to the shaft 6 is a similar wheel 8 which are engaged by an endless carrier built up of links 9 and chuck blocks 10, which are connected to each other by means of bolts 11. The chuck blocks 10 and the links 9 alternate, and connected to each of the chuck blocks is a chuck casing 12 in which is rotatably mounted a chuck for supporting and rotating a blank.

The casing is built up of two members, each of which is provided with a bottom flange 13, secured to the chuck block 10. The two casing members are also secured to each other by means of bolts 14, see Figure 11. The chuck comprises a sprocket wheel 15, the teeth of which are arranged to engage the rollers of a fixed sprocket chain 16 mounted between the channels 4ª, as can be clearly seen in Figures 3, 24 and 25 to support the weight of the endless carrier in its return from the back to the front of the machine. The sprocket wheel 15 is rotatably mounted between the ball-bearings formed of two shells 17 which have screw-threaded connections with the casing members 12, and are arranged to be adjusted relative to each other to center the sprocket wheel 15, and also to take up any lost motion or wear between the shells, the balls 18 and their bearing surfaces on the sprocket wheel.

Slidably mounted within an annular recess on each side of the sprocket wheel is a chuck member 19 which members are connected to each other and the sprocket wheel 15 by means of three bolts 20, as clearly shown in Figure 14, so that these chuck members will be rotated with the sprocket wheel. Slidably mounted in radial recesses in the chuck members 19 are three jaw members 21. Each of these jaw members is connected to a pin 22 which extends radially through the sprocket wheel 15 and interposed between a seat in the sprocket wheel and the head 23 of the pin is a coil spring 24. These coil springs 24 tend to move the jaws outwardly away from the center of the chuck. The ends of the jaw members are tapered, as clearly shown in Figure 12, and the ends of the recesses in the jaw members are also tapered at an angle corresponding to the tapered ends of the jaws. Resting in seats in the jaw members 19 and extending through openings in the sprocket wheel 15 are springs 25 which move the chuck members 19 away from each other and consequently close the jaws of the chuck about an article interposed between the jaw members. It will, therefore, be readily understood that when the two jaw members 19 are moved toward each other by devices acting simultaneously on both of them, the springs 25 will be compressed and permit the spring 24 to move the jaws 21 outwardly and permit an article or a blank to be placed in the chuck. As soon as the pressure on the members 19 is relieved, the springs 25 will force the members 19 away from each other and close the jaws about the tube or bottle blank inserted between them and centralize the tube in the chuck.

Chuck loading devices.

The loading mechanism comprises a hopper, chuck opening devices and a charging device. The hopper, which is designated by the reference character 26, is supported in an inclined position on suitable standards connected to the frame members 2. This hopper as is clearly shown in Figures 1, 2, 3 and 17 to 19 comprises a bottom 27, a back 28 and a fixed side member 29. The opposite side 30 is arranged to be adjusted laterally on the extending supports 31 in order to provide means for feeding various lengths of blanks to the chucks. Pivotally connected at 32 below the bottom 27 of the hopper is a lever 33, which is provided with a plurality of upwardly extending prongs 34 extending through openings in the bottom. The front end of this lever is connected by means of links 35 with a movable front 36 slidably mounted in the front end of the hopper. This lever 33 is also provided with a roller 37 which is arranged to be engaged by a suitable cam to raise and lower the movable front and the lever 33. The front end of the lever 33 is also provided with a prong 34ª which extends through the bottom of a trough supported on the front end of the hopper. The front end of the hopper is in the line of movement of a feed slide 38 having an opening 39 therein, into which a tube blank is dropped. This feed slide is slidably mounted in a guideway supported on a bracket 40, and in which guide it is reciprocated by means of a lever 41. This lever 41 is actuated by a cam 42 on a shaft 43, supported in bearings connected to the frame of the machine, and which shaft extends at right angles to the shafts 5 and 6. The opposite side of the machine is also provided with a slide feeding device 44 mounted on a bracket 45, and reciprocated by a lever 46. This lever is actuated from shaft 48 by a cam 47 similar to the cam 42. Slidably mounted within the feed slide 38 is a feeding plunger 49 which is actuated by a lever 50 and which is, in turn, actuated by a cam 51 on the shaft 43. The various levers 41, 46 and 50 are moved to the opposite position from that shown in the drawings by suitable springs, as shown in Figure 3. The end of the feeding plunger 49 is provided with a spring-pressed plug 52 which engages and feeds the tube into the chuck, and is arranged to provide a yielding member in the feeding mechanism to avoid crushing a tube which may be slightly overlength. The slide feeding device 44 is provided with a removable plug 53, in order to insert plugs of different sizes for making vials of different lengths.

Connected to the end of each of the feed slides 38 and 44 is a cup member 54ª, which members are arranged to engage the chuck members 19 to move them toward each other to open the jaws of the chuck prior to the time the tube is fed to the chuck.

When the feed slides are moved to their outward positions, by the springs actuating on their various levers, a cam on the feed slide 38 will permit the roller 37 on the lever 33 to drop and move the front 36 of the hopper to its closed position. This downward movement of the lever 33 will withdraw the prongs 34 and 34ª and permit the tube which is resting against the prongs 34ª to pass into the opening 39 in the feed slide 38. After the next chuck has been brought to the position between the slides, the slides will be moved inwardly by their cams. As the cups 54ª engage the chuck members, the chuck will be opened and immediately thereafter the feeding plunger 49 will be moved inwardly to feed the tube into the chuck, the forward movement of the tube being stopped by the plug 53. The slides are then withdrawn which will permit the chuck to close on the tube. During the inward movement of the slide 38, the cam 54 will again raise the lever 33, and as only one tube has moved to the movable front or door 36, said tube will move forward against the prongs 34ª as the door is raised, the arrangement being such that one tube is fed to the slide 38 for each reciprocation thereof. The tubes are then moved step by step past the various heating stations where the chucks and tubes are rotated as hereinafter described and at which stations both ends of the tubes are heated by suitable gas burners or any other suitable heating devices.

Finishing devices.

The chucks are successively brought between the finishing devices, there being one on each side of the machine and while there the chuck carriers are locked in a fixed position, in order to centralize them with the finishers, by a locking device hereinafter described.

The finishing devices each comprises a slide 55, mounted on a slide-block 56, connected to the frame of the machine. Connected to each slide block are two finishing wheel arms 57, arranged to oscillate about pins 58, and normally held away from their operative position by means of a spring 59. On the inner end of each of these arms 57 is a finishing wheel 60. Connected to the outer end of each of the arms 57 is a guide 61 for a spring-pressed plunger 62, each of which is provided with an anti-friction roller adapted to engage the side of a slide cam 63, slidably mounted on the slide 55. This cam slide 63 is connected by means of links 64 with an operating lever 65. The operating lever 65 is pivoted to the frame of the machine and is arranged to be actuated by means of a cam 66 to move the slide into operative position. The cam 66 is carried by the shaft 43. The opposite side of the machine is provided with duplicate mechanism, the cam being mounted on the shaft 48, and both of the levers 65 are held against the cams 66 by means of springs connected thereto and the frame of the machine.

Connected to the inner ends of each of the finishing wheel arms 57 is an adjusting device 57ª which forms a stop for the wheels. 68 is a spring pressed mandrel, there being one carried by each slide 55 and arranged to enter the ends of the tubes to form the interior of the mouth thereof, and 57ᵇ is a spring interposed between the slide 55 and the slide cam 63 to permit the slide cam to be advanced after the slide 55 has come to rest.

When the chuck with a heated tube is brought to the finishing station, the levers 65 are actuated by their cams, and will move the slides 55 from the position shown in Figure 4 to that shown in Figure 5 against the stops 69, to bring the mandrels into the ends of the tube. The further movement of the lever 65 will shift the slide cam 63 with relation to the slide 55 to bring the finishing wheel arms 57 against their stops 57ª, as shown in Figure 6, and as the chucks are continuously rotated, the mouths of the tubes will be finished during the movement of the wheels toward each other against the stops 57ª. When the cams 66 pass beyond the lever 65, the springs will return the parts to their outward position away from the ends of the finished tube and permit the chuck to move to the unloading station.

Locking device.

The locking device for locking the chucks in a fixed position while at the finishing station comprises a lever 70 pivoted to one of the cross bars 2ª, the other end thereof being supported in a yoke 71. Connected to this lever between its ends is a slide block 72, which is arranged to move in guides 73 connected to the cross bars 2ª. Mounted below the lever 70 is a transverse shaft 74 having a cam 75 connected thereto. This shaft is arranged to be rotated in timed relation with the other mechanism in order to operate the lock in timed relation to the movement of the chuck carrier. Connected to the slide block 72 are two prong members 76 which are arranged to be moved into engagement with opposite sides of the blocks 10 carrying the chucks, in order to steady said members and to centralize the chucks with relation to the finishing devices. This locking mechanism is reciprocated once for each step movement of the chuck carrier, so as to lock the chuck prior to the engagement of the tube blank by means of the finishers and to unlock it just prior to the next step movement of the chain.

Unloading device.

The unloading device comprises two hollow slides 77 and 77ª, which are arranged to reciprocate in guides carried by the bracket 78. The end of each of these slides is provided with a cup member 79 which members are arranged to engage the chuck members 19 to move them toward each other, and open the chucks. These slides are reciprocated by means of levers 80, which are actuated by cams 81 on the shafts 43 and 48. Slidably mounted in the slide 77 is a plunger 82 which is arranged to be reciprocated by a lever 83 which is in turn actuated by a cam 84 on the shaft 43. The levers 80 and 83 are held against the cams by means of springs such as shown in Figure 9.

As the chucks with the finished blanks are brought opposite the unloading station, the slides 77 and 77ª are moved to the position shown in Figure 9 to open the chuck. Immediately after the chuck is opened the plunger 82 is moved inwardly by means of its cam to eject the finished tube blank from the chuck into the slide 72ª, the finished blank passing out through the opening 85 into a suitable chute such as shown in dotted lines at 85ª in Figure 21 through which it passes to a suitable receptacle, or if desired, to a bottoming machine.

Clutch mechanism.

The various cams for operating the loading, finishing and unloading devices on the shafts 43 and 48, are not connected thereto, but are loosely mounted thereon and are arranged to be driven by clutches slidably mounted on the shafts, so that each set of mechanism can be disconnected to prevent operation on the blank held by any one of the chuck members.

Slidably mounted on the shaft 43 adjacent to the cams 42 and 51 is a clutch member 86 which is arranged to slide on a spline on the shaft. There is also a similar clutch member on the shaft 48, both of which are operated by clutch levers 87 connected to brackets on the frame of the machine. These clutch levers are actuated by lever mechanism 88 connected to a shaft 89. 90 is an operating lever connected to either of the lever mechanisms 88, or to the shaft 90 direct, by which both clutches are simultaneously thrown. The clutch mechanism is so arranged that the clutches can only be thrown into operative position to bring the parts into timed relation with the remainder of the machine.

Cams 66 for actuating the finishing mechanisms are also arranged to be connected and disconnected with their operating shafts by means of clutch mechanism 91. 92 designates the clutch mechanism for the clutches for connecting the cams for the unloading mechanism with the shafts 43 and 48.

*Main driving mechanism.*

Rotatably mounted in bearings in the main frame is a main driving shaft 192 having a pulley 93 thereon, and 94 is a pinion on the main driving shaft in mesh with a gear wheel 95 on the shaft 74. Connected to the shaft 74 is a driving member 97 of a Geneva movement which is provided with an arc-shaped portion and a pin, the pin being arranged to engage openings in the driven wheel 98 connected to the shaft 6 while the arc-shaped portion of the member is arranged to engage similar arc-shaped depressions in the wheel 98 to lock the wheel and shaft during a portion of the rotation of the driving member 97. The wheel 98 is thereby moved intermittently to move the chuck carrier step by step. The cam 75 is connected to the member 97 which is keyed to the shaft 74, as shown in Figure 23. Connected to the main driving shaft 192 is a sprocket wheel 99, and 100 are idlers connected to studs on the frame of the machine. 101 is a sprocket wheel on the shaft 102 and 103 is a sprocket chain for transmitting motion from the shaft 92 to the shaft 102. Connected to the shaft 102 is a sprocket wheel 104, which is connected to a similar sprocket 105 on the shaft 106 by the sprocket chain 107. The sprocket chain 107 is arranged to engage the sprocket wheels 15 of all of the chucks immediately after the chucks pass the loading station and remain in such engagement until they pass the finishing station. The sprocket chain 107 is held in engagement with the chucks by means of idlers 108 carried by swinging arms 109. These arms are suitably weighted by means of weights 110 to retain the idlers in connection with the chain. Connected to each end of the shaft 74 is a bevel gear 111, each of which meshes with the bevel gear 112, one of said last mentioned bevel gears being on the shaft 43 while the other is on the shaft 48.

It will therefore be apparent that all of the parts of the machine are arranged to be driven from the main driving shaft 92.

*Heating means.*

The heating means for the ends of the blanks is illustrated more particularly in Figures 1, 2 and 7. This may comprise a gas supply pipe 115, located adjacent each side of the machine within the side members 2, and an air supply pipe 116, adjacent each end of the machine outside of the side members 2. Suitable connections 117 may extend from the respective pipes to burners 118, mounted above the track 4 in any desired way, to be effective on the end portions of the blanks.

The advantages of our invention result from the provision of a machine for making vial blanks, comprising an endless carrier having a sufficient number of chuck carriers thereon to permit the ends of the blanks to be sufficiently heated by being moved over a plurality of heating stations in order to heat the blanks as rapidly as they can be operated upon by the finishing devices, so that the finishing devices can be operated at the maximum speed. Another advantage results from the provision of clutch mechanism for independently throwing out of action any of the actuating members, in order to permit one or more of the chuck members to pass the operating stations and withholding the mechanism from being shifted into operative relation thereto, whereby the stopping of the entire machine is avoided if a defective blank has been fed to one of the chucks, or if one of the blanks should have been broken. Furthermore, from the provision of a machine in which the various actuating mechanisms are separated, so that the various parts are more accessible for repairs.

We claim:

1. A vial necking macine, comprising an endless link belt carrier, chucks mounted on some of said links, means to move the carrier to move the chucks past a plurality of stations, means for inserting vial blanks into the chucks at one of the stations, said chucks each having means for grasping the bodies of the blanks, devices for positioning the blanks in the chucks means for moving finishing devices into operative position with relation to the blanks at a station beyond the loading station, means for heating the ends of the blanks before they reach the finishing station, there being a plurality of chucks between the finishing station and the loading station, and a blank discharging device at a station beyond the finishing station, substantially as described.

2. A vial necking machine, comprising an endless link belt carrier, means for moving said carrier past a plurality of stations, chucks mounted on some of said links, means for loading said chucks at one station, said chucks each having means for grasping the bodies of the blanks, devices for positioning the blanks in the chucks means for finishing the blanks at a station beyond the loading station, means for heating the ends of the blanks before they reach the finishing station, means at the finishing station for locking the chucks at said station, there being a plurality of loaded chucks between the loading station and the finishing station, and means for rotating the chuck at the finishing station and some of the chucks between said chuck and the chuck at the loading station, substantially as described.

3. A vial necking machine comprising an endless link belt carrier, means for moving said carrier step by step past a plurality of stations, heating means at at least one of said stations, chucks mounted on some of said links, means for loading said chucks at one station, said chucks each having means for grasping the bodies of the blanks, devices for positioning the blanks in the chucks means for finishing the blanks at a station beyond the loading station, means at the finishing station for locking the chucks at said station, there being a plurality of loaded chucks between the loading station and the finishing station, and means for rotating the chuck at the finishing station and some of the chucks between said chuck and the chuck at the loading station, substantially as described.

4. A vial necking machine, comprising an endless link belt carrier, means for moving said carrier step by step, chucks mounted on some of said links, heating and finishing devices to which the chucks are brought, means for rotating the chucks while at the finishing station, and a locking device for locking the chuck at the finishing station, substantially as described.

5. A vial necking machine, comprising an endless carrier, a plurality of chucks mounted on said carrier, means for moving said chucks step by step past a loading station, slides on each side of the chuck carrier, arranged to be moved into engagement with the chucks when they are brought to the loading station to open the chucks, means to feed blanks to one of said slides, a plunger for moving the blank into the chuck after the chuck has been opened, an unloading station, slides on each side of the chuck carrier at the unloading station arranged to be moved into engagement with the chucks when they are brought to the unloading station to open the chucks, a plunger for moving the blank from the chuck after the chuck has been opened, and actuating means for the slides and the plunger, substantially as described.

6. A vial necking machine, comprising an endless link belt carrier, means for moving said carrier step by step past a plurality of stations, chucks mounted on some of said links and arranged to be successively moved to said stations, means for rotating the chucks when at some of said stations, a track for guiding the chuck carrier while moving past some of said stations, and a return track for the carrier arranged to engage the chucks which act as rollers for the carrier, substantially as described.

7. A vial necking machine, comprising an endless link belt carrier, means for moving said carrier past a plurality of stations, heating means at at least one of said stations, said carrier being built up of alternate connecting links and chuck supporting blocks, a chuck casing connected to each of the chuck blocks, a chuck rotatably mounted in each casing, a vial neck-finishing station, and a lock for locking and positioning each chuck casing at the finishing station while the vial blank is being finished, and mechanically actuated means for rotating the chucks while at the finishing station, substantially as described.

8. A vial necking machine, comprising a frame, a plurality of transverse shafts journaled in said frame, a sprocket wheel on each of said transverse shafts, an endless link belt carrier connecting said sprockets, some of the links of said carrier having chucks mounted thereon, means for moving said sprocket wheels step by step to successively move the chucks to a plurality of stations, heating means at one of said stations, chuck loading means at one of said stations, finishing devices at another station beyond the loading station, an unloading station beyond the finishing station. a longitudinal shaft on each side of the machine, means for continuously rotating said longitudinal shafts, and operating cams on the longitudinal shafts for actuating the loading devices, the finishing devices and the unloading devices, substantially as described.

9. A vial machine comprising an endless carrier, means for moving said carrier past a plurality of stations, heating means at one of said stations, a plurality of chucks mounted on said carrier and arranged to be moved past said stations, means for rotating said chucks while moving past some of said stations, means for loading the chucks at one of the stations, means for finishing the vials at another station, means for unloading the chucks at another station, and a clutch device arranged to throw out the loading mechanism without affecting the other mechanisms, substantially as described.

10. A vial machine comprising an endless carrier, heating means cooperating therewith, means for moving said carrier past a plurality of stations, a plurality of chucks mounted on said carrier and arranged to be moved past said stations, means for rotating said chucks while moving past some of said stations, means for loading the chucks at one of the stations, means for finishing the vials at another station, means for unloading the chucks at another station, and clutch devices for disconnecting the finishing mechanism without affecting the other mechanisms, substantially as described.

11. A vial machine comprising an endless carrier, heating means cooperating therewith, means for moving said carrier past a plurality of stations, a plurality of chucks mounted on said carrier and arranged to be moved past said stations, means for rotating said chucks while moving past some of said stations, means for loading the chucks at one of the stations, means for finishing the vials at another station, means for unloading the chucks at another station, and clutch devices for disconnecting the unloading mechanism without affecting the other mechanisms, substantially as described.

12. A vial machine comprising an endless carrier, heating means cooperating therewith, means for moving said carrier past a plurality of stations, a plurality of chucks mounted on said carrier and arranged to be moved past said stations, means for rotating said chucks while moving past some of said stations, means for loading the chucks at one of the stations, means for finishing the vials at another station, means for unloading the chucks at another station, and clutch mechanisms for disconnecting either the loading mechanism, finishing mechanism, or the unloading mechanism without affecting the other mechanisms, substantially as described.

13. A vial necking machine comprising a flexible carrier, means for moving said carrier step by step, a plurality of chucks mounted on said carrier, each of the chucks comprising a casing, a sprocket wheel rotatably mounted in the casing, means adapted to successively engage said sprocket wheels during the movement of the carrier for rotating the chucks, chuck members connected to the sprocket wheel and arranged to be rotated therewith, springs for holding said chuck members away from each other, jaw members radially movable in the sprocket wheel, springs for moving the jaw members radially away from the center of the chuck, and coacting devices on the jaws and the chuck members for closing the jaws when the chuck members are moved away from each other, substantially as described.

14. A loading device for a vial machine comprising a hopper, a plurality of slides, one of said slides having an opening for the reception of the vial blanks, a chuck, means for moving said slides toward the chuck, a sliding plunger in one of said slides, means for moving said plunger in the slide after the slides have been moved to a predetermined position to feed the blanks into the chucks, and blank feeding mechanism arranged to be actuated by one of said slides for feeding blanks thereto, substantially as described.

15. A vial necking machine comprising a plurality of chucks, means for loading the chucks with blanks, means for finishing the blanks, unloading mechanism comprising a plurality of slides arranged to engage the chuck to open it, and a plunger co-acting with one of said slides arranged to move the finished vial from the chuck into the other slide, substantially as described.

16. A vial necking machine comprising a hopper for holding a plurality of blanks, said hopper having a bottom and a movable front, a lever having prongs connected thereto and arranged to move through the bottom of the hopper, said prongs and front having actuating means for permitting the blanks to move one by one from said hopper in a lateral direction, feeding mechanism for feeding the blanks in a longitudinal direction, and actuating connections between the feeding mechanism and the lever for actuating the front and the lever for each action of the feeding mechanism, substantially as described.

17. A vial necking machine comprising a plurality of chucks, means for moving said chucks, means for loading the chucks with blanks, means for finishing the blanks, unloading mechanism comprising a plurality of slides arranged to engage the chucks to open them, a plunger co-acting with one of the slides arranged to move the finished blank into the other slide, means for moving said slides toward and from the chucks, the receiving slide having an opening therein for permitting the blank to move therefrom after the slide has been returned to its inactive position, substantially as described.

18. A vial necking machine comprising an endless carrier, means for moving said carrier step by step past a plurality of heating stations, a plurality of blank holding devices mounted on the carrier and arranged to be moved past said stations, means for delivering a blank to each of said holding devices, continuously operating means for rotating the holding devices while at said stations, means for finishing the blanks at another station, and means for unloading the holding devices at another station, substantially as described.

19. A vial necking machine comprising a plurality of parallel shafts, sprocket wheels on said shafts, a sprocket chain mounted on said wheels, blank holding chucks connected to said sprocket chain, a driving shaft, actuating connections between the driving shaft and one of the other shafts for moving the sprocket chain step by step, means for continuously rotating the driving shaft, a plurality of shafts extending at right angles to the first mentioned shafts, actuating connections between said shafts and the driving shaft, loading devices for loading the chucks, and actuating connections connected to the last mentioned plurality of transverse shafts, a sprocket shafts for actuating the loading mechanism, substantially as described.

20. A vial necking machine comprising a wheel on each of said shafts, a sprocket chain mounted on said wheels, a driving shaft, actuating connections between said driving shaft and one of the transverse shafts for moving the chain step by step, chucks mounted on the sprocket chain, a plurality of longitudinal shafts, actuating connections between the longitudinal shafts and the driving shaft, loading devices for feeding blanks to the chucks, actuating connections for the loading device connected to the longitudinal shafts, blank finishing devices, and actuating connections for the blank finishing devices connected to the longitudinal shafts, substantially as described.

21. A vial necking machine comprising a plurality of transverse shafts, each of said shafts having a sprocket wheel thereon, a sprocket chain mounted on said sprocket wheels, a driving shaft, a Geneva gear connection between the driving shaft and one of the sprocket wheel shafts for intermittently operating the sprocket wheel shaft, means for continuously rotating the driving shaft, a plurality of cam shafts, actuating connections between the cam shafts and the driving shaft for continuously actuating the cam shafts, chuck loading mechanism for feeding blanks to the chucks, actuating levers for the chuck loading mechanism, cams on the cam shafts for actuating the chuck loading mechanism, clutches on the cam shafts for connecting and disconnecting the cams, and actuating means for simultaneously actuating said clutches, substantially as described.

22. A vial necking machine comprising a plurality of transverse shafts, each of said shafts having a sprocket wheel thereon, a sprocket chain mounted on said sprocket wheels, a driving shaft, a Geneva gear connection between the driving shaft and one of the sprocket wheel shafts for intermittently operating the sprocket wheel shaft, means for continuously rotating the driving shaft, a plurality of cam shafts, actuating connections between the cam shafts and the driving shaft for continuously actuating the cam shafts, chuck loading mechanism for feeding blanks to the chucks, actuating levers for the chuck loading mechanism, cams on the cam shaft for actuating the chuck loading mechanism, clutches on the cam shafts for connecting and disconnecting the cams, blank finishing devices, levers for actuating the blank finishing devices, cams on the cam shafts for actuating the levers for the blank finishing devices, clutches for engaging and disengaging the cams for the blank finishing devices, and clutch actuating mechanism for simultaneously disengaging both of said cams from the shafts, substantially as described.

23. A vial necking machine comprising a plurality of transverse shafts, each of said shafts having a sprocket wheel thereon, a sprocket chain mounted on said sprocket wheels, a driving shaft, a Geneva gear connection between the driving shaft and one of the sprocket wheel shafts for intermittently operating the sprocket wheel shaft, means for continuously rotating the driving shaft, a plurality of cam shafts, actuating connections between the cam shafts and the driving shaft for continuously actuating the cam shafts, chuck loading mechanism for feeding blanks to the chucks, actuating levers for the chuck loading mechanism, cams on the cam shaft for actuating the chuck loading mechanism, clutches on the cam shafts for connecting and disconnecting the cams, blank finishing devices, levers for actuating the blank finishing devices, cams on the cam shafts for actuating the levers for the blank finishing devices, clutches for engaging and disengaging the cams for the blank finishing devices, chuck unloading devices, levers for actuating said chuck unloading devices, cams on the cam shaft for actuating said unloading devices, and clutching actuating mechanism for simultaneously actuating both of said clutches, substantially as described.

24. A vial necking machine comprising an endless carrier, means for moving said carrier past a plurality of stations, a plurality of chucks mounted on said carrier and arranged to be moved past said stations, means for feeding a blank to each of said chucks each of said chucks comprising a sprocket wheel, a sprocket chain for engaging said sprocket wheels for rotating the chuck while at the different stations, and means for actuating said last mentioned sprocket chain.

25. A vial necking machine comprising an endless carrier, heating means cooperating therewith, means for moving said carrier step by step to a plurality of stations, a plurality of chucks mounted on the carrier and arranged to be successively brought to said stations, means for rotating said chucks while at said stations, means for loading the chucks at one of the stations, means for finishing the vials at another station, a locking device at the finishing station for locking the chuck at said station against movement, and means for actuating said locking mechanism in timed relation with the finishing means, substantially as described.

26. A vial making machine, comprising an endless carrier, a plurality of chucks thereon, means for feeding a blank to each of the chucks and centering the same therein, means automatically engageable with the chucks after a blank has been fed thereto for rotating the same, said chucks being adapted to grip the blanks with portions of the ends projecting beyond opposite sides thereof, means to move said carrier, means for heating the projecting ends of said blank during movement of the carrier, and means to simultaneously finish the heated ends of said blanks, substantially as described.

27. A vial making machine, comprising an endless carrier, a plurality of chucks thereon, means for feeding a blank to each of the chucks and centering the same therein, said chucks being adapted to grip the blanks with portions of the ends projecting beyond opposite sides thereof, means to intermittently move said carrier to a plurality of successive stations, means at a plurality of said stations for heating the projecting ends of said blanks, and means at another of said stations to simultaneously finish the heated ends of the blank at such station, substantially as described.

28. A vial making machine, comprising an endless carrier, a plurality of chucks thereon, means for feeding a blank to each of the chucks and centering the same therein, said chucks being adapted to grip the blanks with portions of the end projecting beyond opposite sides thereof, means to move said carrier, means for successively heating the projecting ends of said blank during movement of the carrier, means to simultaneously finish the heated ends of said blanks, and means for unloading the finished blanks from said chuck, substantially as described.

29. A vial making machine, comprising an endless carrier, a plurality of chucks thereon, means for feeding a blank to each of the chucks and centering the same therein, said chucks being adapted to grip the blanks with portions of the ends projecting beyond opposite sides thereof, means to intermittently move said carrier to a plurality of successive stations, means at a plurality of said stations for heating the projecting ends of said blanks, means at another of said stations to simultaneously finish the heated ends of the blank at such station, and means for unloading the finished blanks from said chuck, substantially as described.

30. A vial making machine, comprising an endless carrier, a plurality of chucks thereon, means for feeding a blank to each of the chucks and centering the same therein, said chucks being adapted to grip the blanks with portions of the ends projecting beyond opposite sides thereof, means to move said carrier, means for heating the projecting ends of the blank during movement of the carrier, means effective only on the loaded chucks for rotating the blanks while they are being heated and means to simultaneously finish both of the heated ends of a blank, substantially as described.

31. In a vial making machine, an endless carrier, a plurality of blank supports thereon adapted to receive the blanks to be operated upon, means for moving said carrier, means for performing successive operations on said blanks, and means for automatically engaging the blank supports during the travel of the carrier for positively rotating said supports and the blanks carried thereby during the performance of said operations, said means being automatically disconnected from said supports after the completion of said operations, substantially as described.

32. In a vial necking machine, an endless carrier, a plurality of chucks thereon adapted to receive and centrally grip the blanks to be operated upon, means for moving said carrier, means for performing successive operations on said blanks, and means for automatically engaging said chucks during the travel of the carrier for positively rotating the chucks and blanks carried thereby during the performance of said operations, said means being automatically disconnected from the chucks after the completion of said operations, substantially as described.

33. A vial making machine, comprising an endless carrier, a plurality of chucks thereon, means for feeding a blank to each of the chucks and centering the same therein, means for rendering the feeding means for any of the chucks inoperative at will, said chucks being adapted to grip the blanks with portions of the ends projecting beyond opposite sides thereof, means to move said carrier, means for heating the projecting ends of said blanks, and means for finishing the heated ends of said blanks, substantially as described.

In testimony whereof we have hereunto set our hands.

BENJAMIN T. HEADLEY.
PARKE H. THOMPSON.

Witnesses:
THOMAS WHITAKER,
MARY M. TULLER.